United States Patent
Tanabe et al.

(10) Patent No.: US 6,338,583 B1
(45) Date of Patent: Jan. 15, 2002

(54) PRINTING APPARATUS

(75) Inventors: Kenichi Tanabe; Hiroshi Ono, both of Tokyo; Yoshiharu Konishi; Hitoshi Hayama, both of Suwa, all of (JP)

(73) Assignees: King Jim Co., Ltd.; Seiko Epson Corporation, both of (JP)

(*) Notice: Subject to any disclaimer, the term of this patent is extended or adjusted under 35 U.S.C. 154(b) by 0 days.

(21) Appl. No.: 09/475,214

(22) Filed: Dec. 29, 1999

(30) Foreign Application Priority Data

Jan. 13, 1999 (JP) .......................................... 11-006212

(51) Int. Cl.$^7$ ................................................. B41J 5/30
(52) U.S. Cl. ............................. 400/63; 400/61; 400/70
(58) Field of Search ............................. 400/63, 61, 70, 400/76, 611, 615.2

(56) References Cited

U.S. PATENT DOCUMENTS

| | | | |
|---|---|---|---|
| 4,951,233 A | * 8/1990 | Fujiwara et al. | ............ 364/523 |
| 5,448,685 A | * 9/1995 | Ogura et al. | ................ 395/117 |
| 5,680,520 A | * 10/1997 | Watanabe et al. | ............ 395/110 |
| 5,772,340 A | * 6/1998 | Nunokawa et al. | ............ 400/70 |
| 5,873,110 A | * 2/1999 | Toyosawa et al. | .......... 707/518 |
| 5,967,675 A | * 10/1999 | Hastings et al. | ............... 400/61 |
| 6,168,323 B1 | * 1/2001 | Hayama et al. | ................ 400/61 |

FOREIGN PATENT DOCUMENTS

| | | | |
|---|---|---|---|
| JP | 6 227052 A | * | 8/1994 |
| JP | 7 160692 A | * | 6/1995 |
| JP | 11-232064 | | 8/1999 |

* cited by examiner

Primary Examiner—John S. Hilten
Assistant Examiner—Minh H. Chau
(74) Attorney, Agent, or Firm—Lorusso & Loud

(57) ABSTRACT

The printing apparatus comprises: an image display part for displaying an image to be printed on a display screen; a screen switching part being capable of switching the display screen of the image display part to any one of a plurality of editing screens for editing the image to be printed; a storage part for storing a printed information of the image to be printed, the printed information being based on an edited content set by each of the editing screens; and a printed information display part for displaying the printed information, which is stored in the storage part, on the display screen by hierarchical printed information screens.

5 Claims, 11 Drawing Sheets

FIG.10

| Hierarchies | First Hierarchy | Second Hierarchy | Third Hierarchy |
|---|---|---|---|
| Title | Check | Select in First Hierarchy | |
| Options | ⌐Document Format | Display Set Value | Possible to Designate in Document Format |
| | ⌐Paragraph Style | Display Set Value | Possible to Designate in Paragraph Style |
| | ⌐Character Mode | Display Set Value | Possible to Designate in Character Mode |
| | ⌐Color Format | Display Set Value | Possible to Designate in Color Format |
| | ⌐Color Style | Display Set Value | Possible to Designate in Color Style |
| | ⌐Color Mode | Display Set Value | Possible to Designate in Color Mode |
| | ⌐Used Tape | Display Kind of Used Tape | |
| | ⌐Residual Quantity of Ink | Display Residual Quantity of Ink | |

FIG.13

Possible to Designate in Document Format

PRINTING APPARATUS

BACKGROUND OF THE INVENTION

1. Field of The Invention

The present invention relates generally to a printing apparatus, such as a tape printing apparatus and a word processor, which has the function of displaying the printed information of an image to be printed.

2. Description of Conventional Art

In conventional printing apparatuses of this type, when an image displayed on a display screen to be printed is edited in various ways, e.g., when the background of an image (a character image) is set to be a desired image or color or when the color of characters is set to be a desired color, a display screen is switched to any one of screens for editing (editing screens), from the point of view of the need and handling for displaying a plurality of options. For example, the background of an image is set on an editing screen for setting the background, and the color of characters is set on an editing screen for setting the color of characters.

By the way, when a wide range of editing operations for an image are carried out as described above, there are some cases where a user forgets what has been set about some of various editing operations, and there are some cases where the user wants to verify the printed information of the image based on the edited contents of the image before printing. In such cases, similar to the above described editing operation for the image, the display screen is switched to an editing screen for desired editing, and the printed information is verified on the editing screen, so that the verification operation is very complicated. That is, in order to verify one printed information after verifying another printed information, the display screen must be switched from an editing screen to the original display screen, and then, the display screen must be switched to another editing screen. In addition, when an editing operation for a lower hierarchy (a lower editing operation) is provided for editing an image, in order to verify the printed information for a lower editing operation after verifying the printed information for another lower editing operation, the display screen must be switched to the original display by two or more stages, and then, the display screen must be switched to an editing screen for the lower editing operation by two or more stages again. Therefore, it is required to carry out four or more stages of switching operations for the display screen, so that the operation for verifying the printed information is further complicated.

Although such a problem is common to monochrome printing apparatuses and color printing apparatuses, this problem in color printing apparatuses is more serious than that in monochrome printing apparatuses since there are a large number of edited items for color.

SUMMARY OF THE INVENTION

It is therefore an object of the present invention to eliminate the aforementioned problems and to provide a printing apparatus capable of easily and simply verifying the printed information of an image to be printed.

In order to accomplish the aforementioned and other objects, according to one aspect of the present invention, a printing apparatus comprises: image display means for displaying an image to be printed on a display screen; screen switching means being capable of switching the display screen of the image display means to any one of a plurality of editing screens for editing the image to be printed; storage means for storing a printed information of the image to be printed, the printed information being based on an edited content set by each of the editing screens; and printed information display means for displaying the printed information, which is stored in the storage means, on the display screen by hierarchical printed information screens.

In the above described printing apparatus, a printed information screen in an upper hierarchy of the hierarchical printed information screens may include a state information on printing means for carrying out printing and an information on a printed medium. In addition, a printed information screen in a lower hierarchy of the hierarchical printed information screens may include an information for introducing an editing screen for editing the printed information. In addition, the printed information display means may be formed so as to be capable of carrying out a scroll display of information, which is included in the printed information screens, on the display screen. Moreover, when all information included in each of the printed information screens is not able to be displayed on the display screen, the printed information display means may be formed so as to be capable of selectively displaying another information, which is not able to be displayed, on the display screen.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 10 is a table for explaining the hierarchical structure of a printed information display in the preferred embodiment;

FIG. 13 is a schematic diagram for explaining an example of a printed information display screen in a third hierarchy in the preferred embodiment.

DESCRIPTION OF THE PREFERRED EMBODIMENTS

Figure 1A:
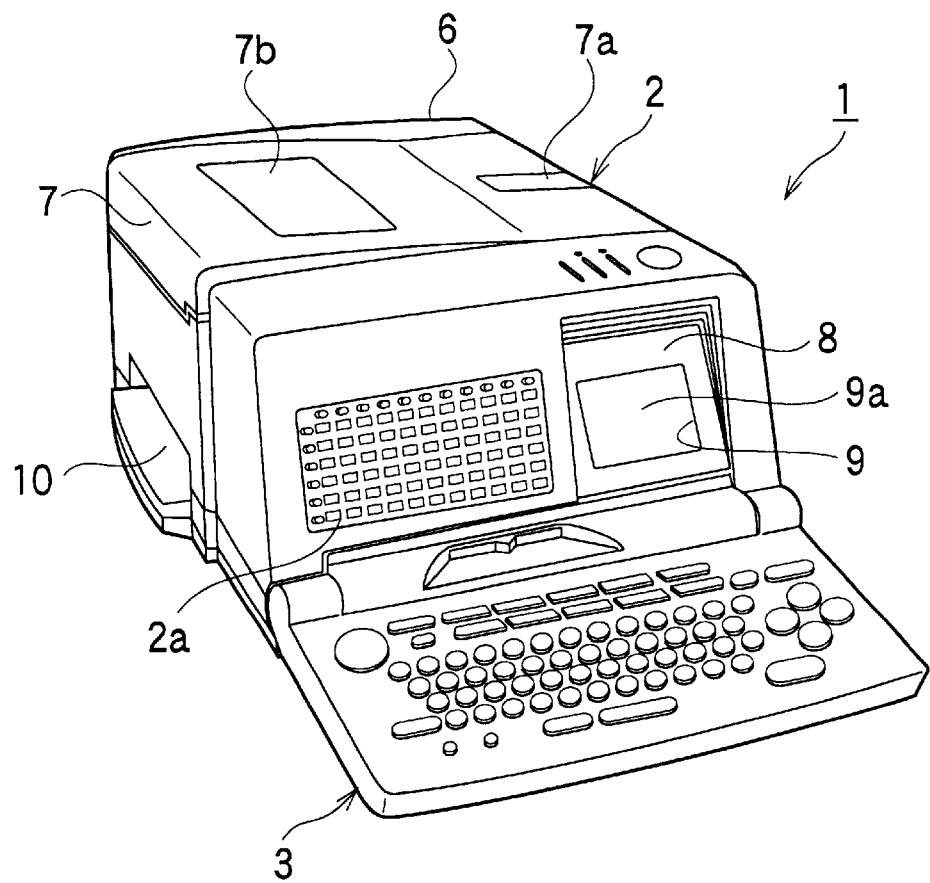
FIGS. 1A and 1B are perspective views of a tape printing apparatus, to which a preferred embodiment of a printing apparatus according to the present invention is applied.

Referring now to the accompanying drawings, a preferred embodiment of a printing apparatus according to the present invention, which is applied to a tape printing apparatus, will be described below.

As shown in FIG. 1, a tape printing apparatus 1 is designed to color-print desired characters or the like, which have been keyed, on a tape T by the ink-jet system to cut a printed part out of the tape T to prepare a label.

The tape printing apparatus 1 comprises an apparatus body 2, a keyboard 3 for inputting and editing characters, a tape cartridge 4 (see FIG. 2) for housing therein a tape T serving as a printed medium, and an ink cartridge 5 (see FIG. 2) which is filled with four color inks. The tape cartridge 4 and the ink cartridge 5 are detachably mounted on the apparatus body 2.

Figure 1B:
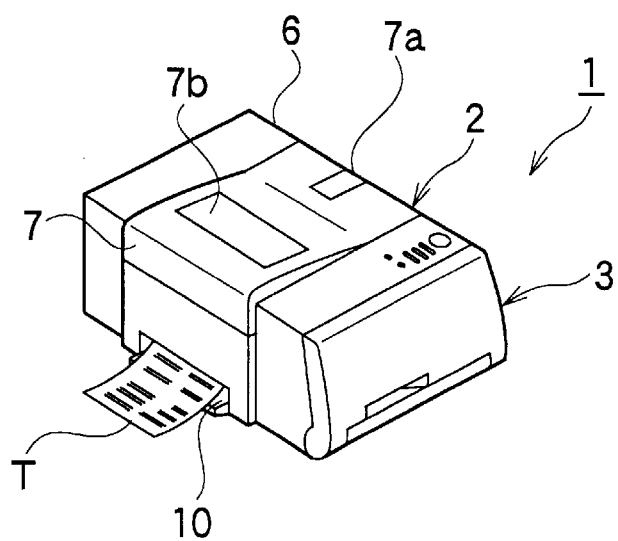

The apparatus body 2 has an apparatus case 6 as an outer frame, and a lid 7 which is provided on the top of an intermediate portion of the apparatus body 6 and which is open and closed when the tape cartridge 4 and the ink cartridge 5 are attached or detached. The lid 7 has transparent windows 7a and 7b for allowing the loaded tape cartridge 4 and ink cartridge 5 to be visible to the naked eye. In the right part on the front side (on the side of the keyboard 3) of the apparatus case 6, there is formed a small window 9 corresponding to an image display part 8 which is built in the apparatus body 2. A transparent panel 9a is built in the small window 9. In addition, in the left part on the front side (on the side of the keyboard 3) of the apparatus case 6, a region 2a capable of sticking a color reference label is ensured (FIG. 1A shows the state that the color reference label is stuck). Moreover, on the side surface (on the left surface in the figure) of the apparatus case 6, a tape exit 10 for feeding the tape T to the outside is formed.

Figure 2:
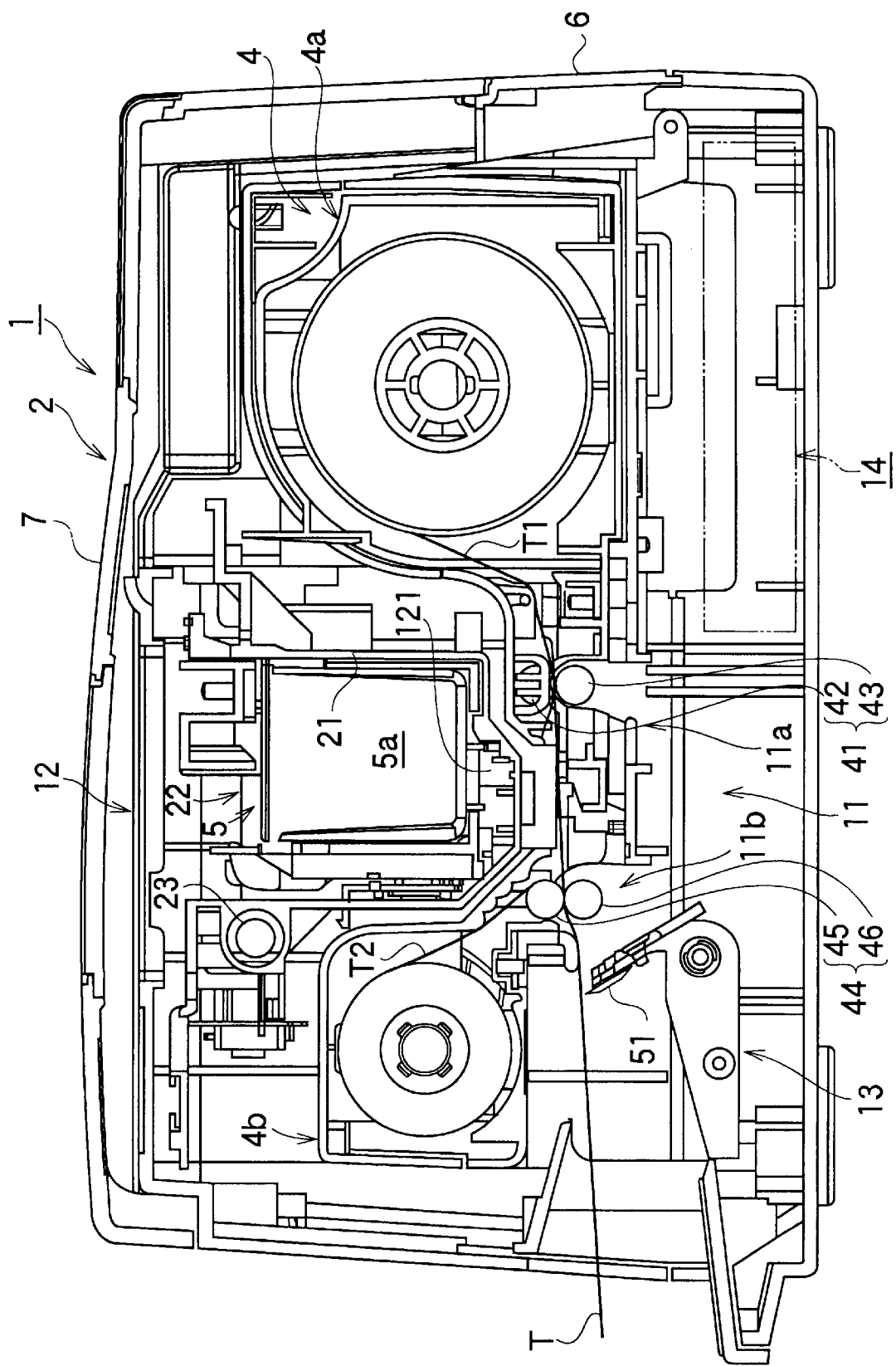
FIG. 2 is a sectional view showing the internal structure of an apparatus body of the tape printing apparatus in the preferred embodiment.

As shown in FIG. 2, the tape cartridge 4 for housing therein the tape T wound onto the tape cartridge 4, a tape feeding part 11 for feeding the tape T to the outside of the apparatus body 2, a printing part 12 for color-printing an image to be printed, a cutting part 13 for cutting the tape T, and a circuit part 14 for controlling the respective parts of the tape printing apparatus 1 are mounted in the apparatus case 6.

The tape cartridge 4 comprises a printed tape T1, on which an image to be printed is printed, and a laminate tape T2 which is stuck on the printed portion of the printed tape T1. The printed tape T1 and the laminate tape T2 are wound onto and housed in a printed tape housing part 4a and a laminate tape housing part 4b, respectively, which are provided on both sides of the printing part 12. The printed tape T1 comprises a base tape, an adhesive layer applied on the reverse surface of the base tape, and a released paper tape mounted on the adhesive layer. On the other hand, the laminate tape T2 comprises a base tape of a transparent film, and an adhesive layer applied on the reverse surface of the base tape. The width of the base tape of the laminate tape T2 is substantially the same as that of the printed tape T1. During printing, the base tape of the laminate tape T2 is stuck on the printed tape T1 so that both side edges thereof are trued up.

As the tape cartridge 4, there are some tape cartridges which house therein only the printed tape T1 and which do not have the laminate tape T2. As the printed tape T1 to be housed in the tape cartridge 4, various printed tapes having different widths are prepared.

The printing part 12 comprises a print head 121 having a large number of ink nozzles (not shown) arranged on the tip thereof, a cartridge holder 21 provided on the upper side of the print head 121, an ink cartridge 5 detachably mounted on the print head 121 via the cartridge holder 21, and a carriage 22, on which the print head 121 and the ink cartridge 5 are mounted. The ink cartridge 5 has an ink tank 5a filled with four color inks of yellow, cyanogen, magenta and black. When the ink cartridge 5 is mounted on the print head 121, the ink tank 5a of the ink cartridge 5 for the respective colors is communicated with the printed head 121 to allow the supply of the inks of the respective colors.

The carriage 22 is slidably mounted on a carriage guiding shaft 23 extending in the lateral directions of the printed tape T1. The carriage 22 is designed to be reciprocated right and left (in the lateral directions of the printed tape T1) by means of a timing belt (not shown) by the reciprocal driving of a carriage motor (CR motor) 122 (see FIG. 5). In addition, the carriage 22 has a projecting shading plate (not shown). When the shading plate faces a position sensor 98 (see FIG. 5) of a photo-interrupter or the like, it is detected that the print head 121 is positioned at a home position (not shown), and a position correction, such as a zero point correction, is carried out. That is, since the home position serves as a waiting position for the print head 121 and as a reference position during printing, it is possible to accurately move the carriage 22 to the respective positions in the lateral directions in a printed rage of the printed tape T1 by rotating the CR motor 122 from the reference position by a predetermined number of steps, so that it is possible to carry out a desired color printing on the surface of the printed tape T1 by driving the print head 121 in synchronism with the movement of the carriage 22.

Furthermore, the carriage 22 is also provided with a residual ink quantity sensor 97 (see FIG. 5) for detecting the residual quantities of respective color inks in the ink tank 5a of the ink cartridge 5 although this is not shown.

The tape cartridge 4 is provided with an identification plate (not shown) indicative of identification information by a bit pattern or the like. When the identification sensor 99 (see FIG. 5) mounted on the carriage 22 faces the identification plate, the kind of the tape T and the printing starting position on the printed tape T1 of the tape T are detected.

The tape feeding part 11 has a printed-tape-side feed mechanism 11a and a laminate-tape-side feed mechanism 11b, which are provided on both sides of the print head 121 on the upstream and downstream sides in the feed direction, respectively. The printed-tape-side feed mechanism 11a comprises: a feed roller 41 comprising a feed driven roller 42 and a feed driving roller 43 which are arranged up and down; and a tape feed motor (PF motor) 11 (see FIG. 5) for rotating the feed driving roller 43.

The feed driving roller 43 is provided on the apparatus body 2, and the feed driven roller 42 is provided on the tape cartridge 4. After the tape cartridge 4 is mounted in the apparatus body 2, the feed driven roller 42 causes the printed tape T1 to be nipped between the feed driven roller 42 and the feed driving roller 43 so as to press the printed tape T1 on the feed driving roller 43. When the tape feed motor 111 rotates in this state, the printed tape T1 nipped between the feed driven roller 42 and the feed driving roller 43 is fed forwards.

On the other hand, the laminate-tape-side feed mechanism 11b comprises: a laminate roller 44 comprising a laminate driven roller 45 and a laminate driving roller 46 which are arranged up and down; and a laminate motor (not shown) for rotating the laminate driving roller 46. Furthermore, the laminate motor is the same as the above described tape feed motor (the PF motor 111), and the power thereof is divided by a speed reducing gear train (not shown) to operate the feed roller 41 and the laminate roller 44.

Similar to the above described feed driving roller 43 and feed driven roller 43, the laminate driving roller 46 and the laminate driven roller 45 are provided in the apparatus body 2 and the tape cartridge 4, respectively. After the tape cartridge 4 is mounted in the apparatus body 2, the laminate driven roller 45 causes the printed tape T1 and the laminate tape T2 to be nipped between the laminate driven roller 45 and the laminate driving roller 46 so as to press the printed tape T1 and the laminate tape T2 on the laminate driving roller 46. When the laminate motor rotates in this state, the printed tape T1 and the laminate tape T2, which are nipped between the laminate driven roller 45 and the laminate driving roller 46, are fed forwards while being stuck on another.

The cutting part 13 comprises a cutter 51, and a cutter motor 131 (see FIG. 5) for driving the cutter 51. After printing is completed, the tape T is step-fed by a predetermined distance by means of the PF motor 111 to be stopped. Immediately thereafter, the cutter motor 131 is driven to cut the printed portion of the tape T.

The keyboard 3 is mounted on the apparatus body 2 so as to be pivotable between a vertical state and a horizontal state. When the tape printing apparatus 1 is used, the keyboard 3 is in the horizontal state (see FIG. 1A), and when the tape printing apparatus 1 is carried or stored, the keyboard 3 is in the vertical state (see FIG. 1B). Thus, the tape printing apparatus 1 has excellent portability and storability since the whole apparatus is compact when being carried or stored.

Figure 3:
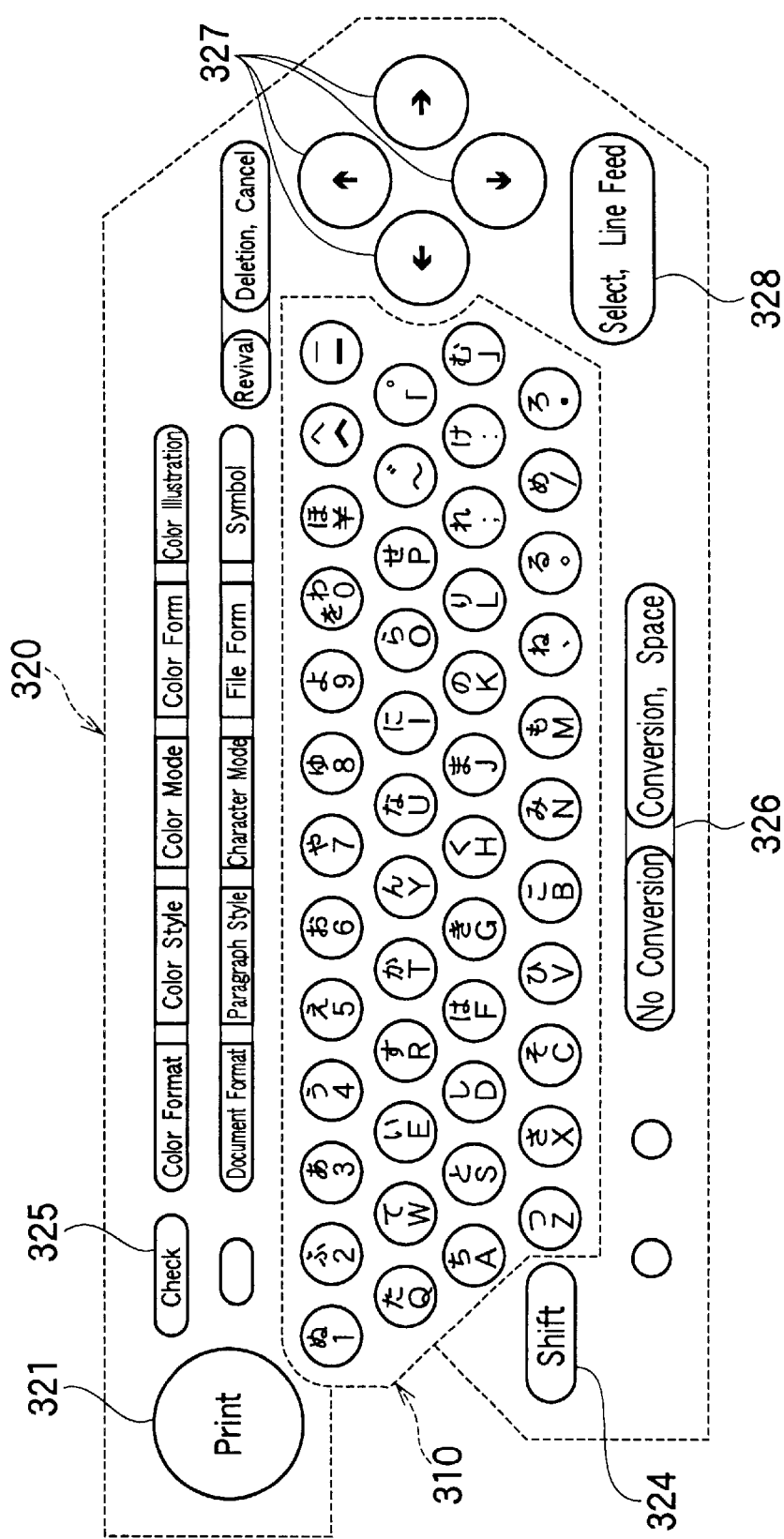
FIG. 3 is a schematic diagram showing the key array of a keyboard in the preferred embodiment.

FIG. 3 shows the key array of the keyboard 3. As shown in FIG. 3, the keyboard 3 is provided with a large number of character keys 310 for inputting characters, such as letters and symbols, and a plurality of function keys 320 arranged on the upper, lower and right sides of the character keys 310. Each of the character keys 310 has a circular convex shape. On the surface and upper side thereof, hiragana characters, alphabets, numeric characters and symbols are described. On the other hand, most of the function keys 320 have a rectangular or elliptic convex shape, and the function of each key and so forth are described on the surface and upper side thereof.

Most of the upper function keys 320 serve to change the operation mode of the tape printing apparatus 1 to any one of various editing modes. Therefore, by depressing these keys, the operation mode can be changed to, e.g., an editing mode for setting the background of an inputted character image or an editing mode for setting the color of characters of the character image. Furthermore, on the left end of the upper row of the function keys 320, a print key 321 for commanding a print operation is arranged.

On the other hand, the lower and right rows of the function keys 320 include keys for converting characters into kanji when the operation mode is an input mode and for selecting a desired one from options when the operation mode is an editing mode. Therefore, for example, when input characters are converted into kanji, the user suitably operates a conversion key 326, a cursor key 327 and a select key 328. Furthermore, a shift key 324 is provided for inputting characters described on the upper side of any one of the character keys 310 or for carrying out the function described on the upper side of any one of the function keys 320, by simultaneously depressing the corresponding one of the character keys 310 and the function keys 320. In addition, reference number 325 denotes a check key for starting a check function, which serves as the feature of the tape printing apparatus 1 and which will be described later. Furthermore, a power supply key is not provided on the keyboard 3, and it is provided on the front side of the upper surface of the apparatus body 2.

Figure 4:
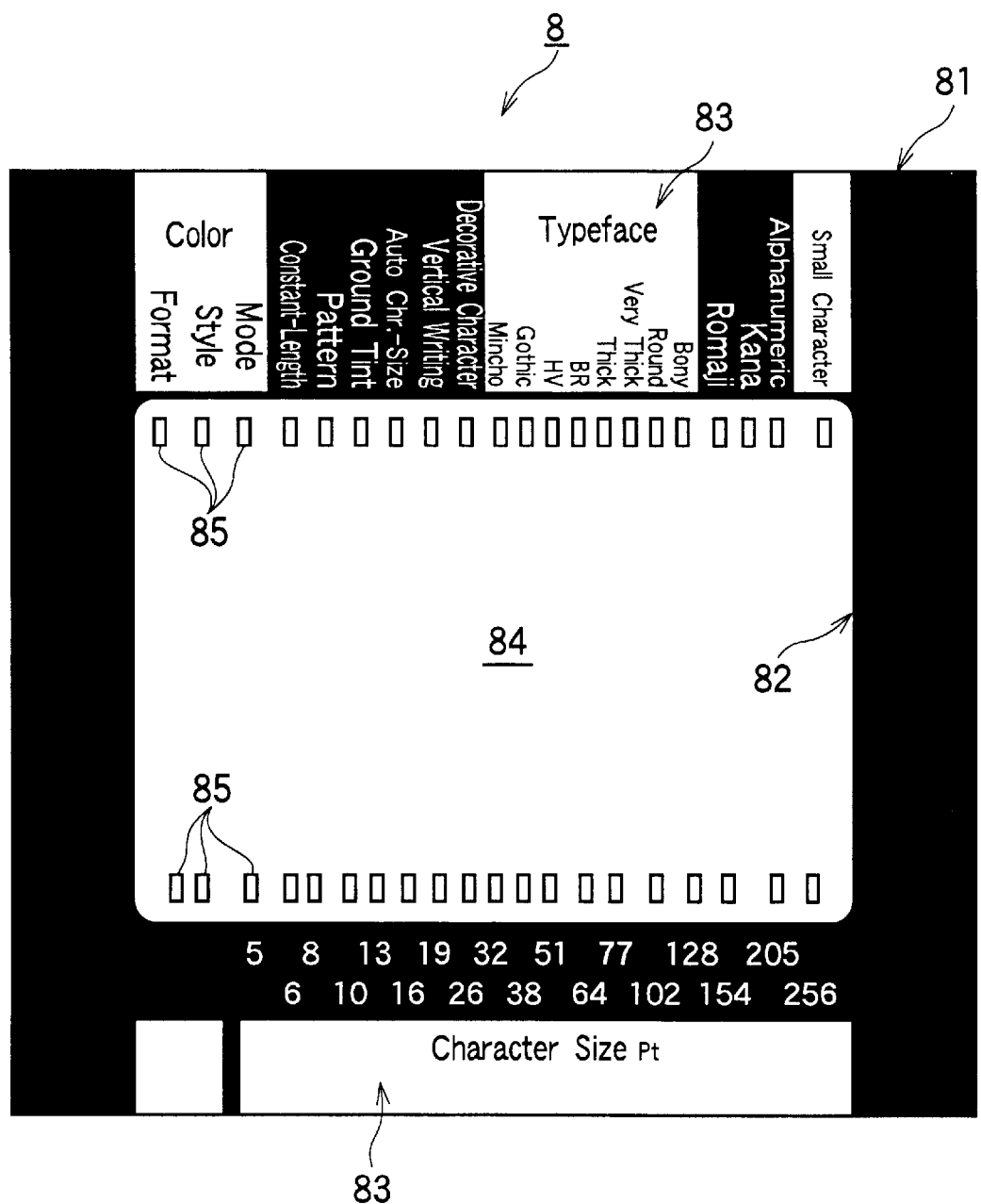
FIG. 4 is an enlarged plan view of an image display part in the preferred embodiment.

FIG. 4 is an enlarged plan view of the image display part 8. The image display part 8 has a display screen 81 for displaying an image of input characters and so forth. The display screen 81 comprises a monochrome liquid crystal display, which comprises: a liquid crystal display part 82 for displaying the image and a plurality of indicators 85, which will be described later, by a liquid crystal; and a mode describing part 83, which is provided around the liquid crystal display part 82 and on which the meaning of each of the indicators 85 has been previously described. On a display part 84 occupying most of the liquid crystal display part 82, an image picture (a print image) for the character image to be printed, and menu and options during the editing of the character image are displayed in addition to the character image. In addition, when the print image is displayed on the liquid crystal display part 82, the image can be displayed by four gradations (four-gradation display).

The tape print apparatus 1 is designed to turn the indicators 85 on to display what contents of the input state (input in romaji (Roman letters), kana or the like) from the keyboard 3, the typeface (Mincho type, Gothic type or the like) for the character image during printing, the print style (the vertical writing, the constant-length print or the like), and the background (the ground tint pattern or the like) for the character image and so forth are set during the use thereof. Therefore, for example, when the input state is the input in romaji, the indicator 85 arranged directly below the "romaji" in the mode describing part 83 is turned on, and when Gothic type is designated as the typeface for the character image, the indicator 85 arranged directly below "Gothic type" in the mode describing part 83 is turned on.

Figure 5:
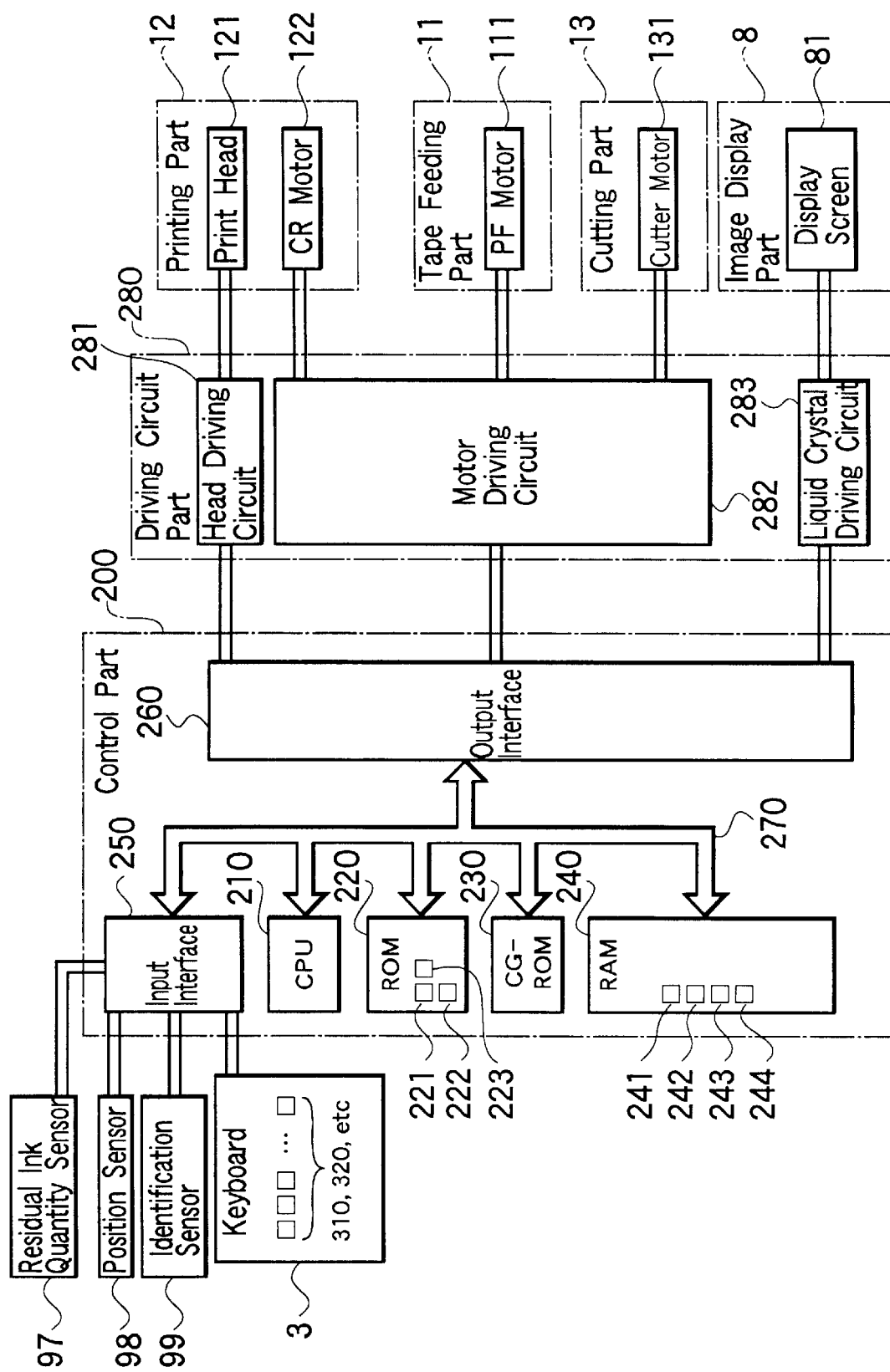
FIG. 5 is a block diagram of a control system of the tape printing apparatus in the preferred embodiment.

Referring to FIG. 5, the basic construction of a control system of the tape printing apparatus 1 will be described below.

As shown in FIG. 5, the control of the tape printing apparatus 1 is executed by a control part 200 in response to input signals from the keyboard 3, the position sensor 98 and the identification sensor 99. The control part 200 is designed to control the printing part 12, the tape feeding part 11, the cutting part 13 and the image display part 8 via a driving circuit part 280.

The control part 200 has a CPU 210, a ROM 220, a character generator ROM (CG-ROM) 230, a RAM 240, an input interface 250 and an output interface 260, which are connected to each other by means of a bus 270.

The ROM 220 has stored therein a color converting table 221, a character modifying table 222 and so forth, in addition to a control program processed by the CPU 210. As the control program, a printed information display program 223, which will be described later, is also stored.

The CG-ROM 230 has stored therein font data for characters, such as letters, symbols and figures, which have been prepared in the tape printing apparatus 1. When code data for identifying characters are given, the CG-ROM 230 outputs the corresponding font data.

The RAM 240 has regions for various register groups 241, a text memory 242 for storing text data for characters inputted from the keyboard 3, a display image data memory 243 for storing display image data for the display screen 81, and a printed image data memory 244 for storing printed image data. These regions are used as operation regions for control processing. Furthermore, the RAM 240 is supplied with power supply by a backup power supply circuit (not shown) so that the RAM 240 holds the stored data even if a power supply is turned off.

The input interface 250 is a circuit, which is connected to the keyboard 3, the residual ink quantity sensor 97, the position sensor 98 and the identification sensor 99, for allowing various command and input data from the keyboard 3, a residual quantity detecting signal from the residual ink quantity sensor 97, a position detecting signal from the position sensor 98, and an identification information signal from the identification sensor 99, to be incorporated into the bus 270. In addition, the output interface 260 is a circuit for outputting data and control signals, which have been outputted from the CPU 210 or the like to the bus 270, to the driving circuit part 280.

The residual ink quantity sensor 97 is designed to detect the residual quantities of the respective color inks in the ink tank 5a of the ink cartridge 5 to input the detected signal to the control part 200.

The position sensor 98 is designed to detect that the print head 121 reaches the home position to input the detected signal to the control part 200, and the identification sensor 99 is designed to detect the kinds of the tape cartridge 4 and the tape T and a print starting position so as to input the detected signal to the control part 200.

The driving circuit part 280 comprises a head driving circuit 281, a motor driving circuit 282 and a liquid crystal driving circuit 283. The head driving circuit 281 is designed to drive the print head 121 of the printing part 12 in accordance with a control signal outputted from the control part 200. Similarly, the motor driving circuit 282 is designed to drive the CR motor 122 of the printing part 12, the PF motor 111 of the tape feeding part 11, and the cutter motor 131 of the cutting part 13 in accordance with the indication of the control part 200. Similarly, the liquid crystal display circuit 283 is designed to control the image display part 8 in accordance with the indication of the control part 200.

In the control system with such a construction, the CPU 210 of the control part 200 receives various commands and data from the keyboard 3, the position detecting signal from the position sensor 98, and the identification information signal from the identification sensor 99, via the input interface 250 in accordance with the control program in the ROM 220, and processes the font data from the CG-ROM 230, and various data in the RAM 240 to output control signals to the driving circuit part 280 via the output interface 260. By the control signals, the printing control and the display control for the display screen 81 are carried out, and the print head 121 is controlled to carry out the color printing on the tape T on predetermined printing conditions. Thus, the whole tape printing apparatus 1 is controlled.

Figure 6:
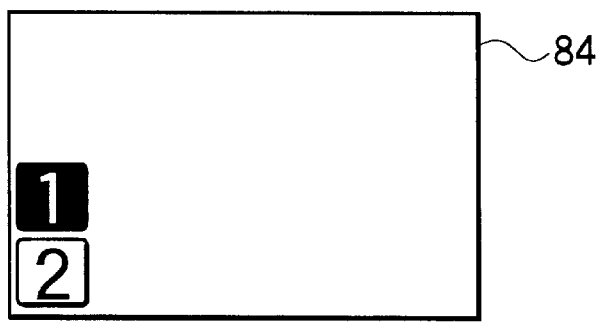
FIG. 6 is a schematic diagram for explaining an initial screen of the display part of the tape printing apparatus in the preferred embodiment.
Figure 7:
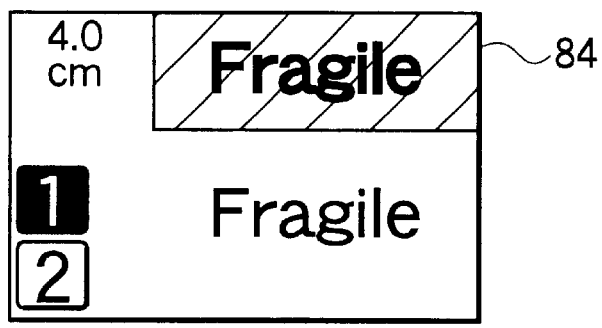
FIG. 7 is a schematic diagram showing the display part in the preferred embodiment when characters are inputted.

Referring to FIGS. 6 and 7, the operating procedure and operation for preparing a label by means of the tape printing apparatus 1 will be described below.

First, when a power supply is turned ON to start the tape printing apparatus 1, an image displayed immediately before the power supply is turned OFF during the last starting is displayed on the display screen 81. That is, even if the power supply is turned OFF in this tape printing apparatus 1, the RAM 240 is designed to store therein data for the last image, together with the editing data thereof, in addition to various set data registered by a user, so that an image based on the data for the image and the editing data is displayed on the display screen 81 immediately after the starting.

Furthermore, when the power supply has been turned OFF after all of images, such as inputted characters, are erased in the last starting, or when the tape printing apparatus 1 is first used, only a line headmark (a mark wherein a line number is surrounded by a quadrangle) indicative of a line during printing is displayed on the display part 84 of the display screen 81 as shown in FIG. 6.

When only the line head mark shown in FIG. 6 is displayed, a process for inputting a character string "Fragile" to edit the character string in various ways to print the edited character string to prepare a label will be described in due order.

FIG. 7 shows the display part 84 immediately after the character string "Fragile" is inputted. As shown in FIG. 7, if the character string "Fragile" is inputted, the character string "Fragile", together with its printed image and label length (which will be hereinafter referred to as a "tape length"), which are arranged on the upper half thereof, is displayed on the display part 84. Furthermore, the user can operate a predetermined function key 320 to select whether the printed image should be displayed. FIG. 7 shows an example that the simultaneous display function for the printed image is selected.

This printed image is displayed on the display part 84 by allowing the data for the character string "Fragile" to be expanded for the printed image by means of the RAM 240 and outputting its control signal to the liquid crystal driving circuit 283. On the other hand, the tape length is displayed as a value obtained by adding forward and backward margins to a value which is calculated on the basis of the size of each of the characters of "Fragile", the number of the characters and the character gap (i.e. distance between adjacent two of the characters). Furthermore, in the tape printing apparatus 1, the user can set the length of a label in order to make a label having a constant length (a constant-length printing). In this case, the set length is displayed as the tape length.

Although it is possible to make a label by inputting the character string "Fragile" as described above and printing the inputted character string as it is, the tape printing system 1 can edit the inputted characters and so forth in various ways to make an expressive label.

Edited items will be briefly described below. As units for editing, there are three stages of formats, styles and modes. The formats relate to the whole label. Among the formats, one having no relation to color is called a document format, and one relating to color is called a color format. The styles relate to each part (which will be hereinafter referred to as a "paragraph"), which has, e.g., one or more characters wished to have different attributes even if the number of lines is different or the same and which is divided in a longitudinal direction of the label. Among the styles, one having no relation to color is called a paragraph style, and one relating to color is called a color style. The modes relate to each of characters. Among the modes, one having no relation to color is called a character mode, and one relating to color is called a color mode.

Furthermore, the mode relating to each of characters can be designation of a paragraph or the whole label according to its designation. In addition, the style relating to each of paragraphs can be designation of (the character string of) the whole label according to its designation.

The edited items belonging to the document format include (1) a ground tint attribute relating to the selection of the kind of a background pattern (a ground tint), (2) a ground tint pattern attribute relating to the size of a ground tint, (3)

a constant-length printing attribute relating to the selection of a length in the constant-length printing, (4) a justification attribute relating to the arrangement of each of characters in the constant-length printed label (front justification, centering, equal space, rear justification), (5) a margin attribute relating to the amount of margins provided on the front and rear sides in a longitudinal direction of a label, and so forth.

The edited items belonging to the color format include (1) a background color attribute for defining the color of the background, (2) a ground tint color attribute for defining the color of the ground tint, and so forth.

The edited items belonging to the paragraph style include (1) a character size attribute relating to (the combination of) the character size on each line, (2) an alignment attribute relating to how to arrange character strings on each line (front-aligned, centering, equal space, rear-aligned), (3) an outer frame/tabular form attribute relating to the application of a frame for paragraphs and of lines constituting a table, and so forth.

The edited items belonging to the color style include (1) a closing-line color attribute defining the color of closing lines (lines constituting the above described frame or table) when a document has the closing lines, (2) an intraframe color attribute defining the color in an outer frame (including an outer peripheral frame in the case of a tabular form) when a paragraph has the outer frame, and so forth.

The edited items belonging to the character mode includes (1) a vertical/horizontal attribute defining whether a character serving as an object should be vertically or horizontally written, (2) a Japanese character typeface attribute defining the Japanese character typeface for a character serving as an object, (3) an alphanumeric character typeface attribute defining the alphanumeric character typeface for a character serving as an object, (4) a decorative character attribute defining the modification for a character serving as an object (outline character, shadow character, italic character, highlighted character, etc.), (5) an expansion/contraction attribute defining whether a character serving as an object should be expanded or contracted from the basic character size on a line, to which the character belongs, (6) an arrangement attribute defining whether the expanded or contracted character should be arranged at the same position as, below or above the basic position on the line, (7) an enclosing/meshing attribute defining whether the enclosing or half-tone dot meshing should be applied to a character serving as an object, (8) a character gap attribute defining a gap between a character serving as an object and the next character, (9) a pitch attribute defining whether the character gap should be automatically determined or fixed, and so forth.

The edited items belonging to the color mode include (1) a character color attribute defining the color of a character serving as an object, (2) an outline color attribute defining the color of the outline of a character when the character includes the outline, (3) a character shadow color attribute defining the color of the shadow of a character when the character has the shadow, (4) an enclosing line color attribute defining the color of the enclosing line of a character when the character has the enclosing line, (5) an intra-enclosure color attribute defining the color in the enclosure of a character when the character has the enclosure, (6) a half-tone dot meshing color attribute defining the color of the half-tone dot meshing of a character when the character has the half-tone dot meshing, and so forth.

As described above, since there are a wide range of edited items having an influence on the printing processing. Therefore, the tape printing apparatus 1 does not have an editing mode every edited item, and have inclusive editing modes, such as a document format editing mode, a color format editing mode, a paragraph style editing mode, a color style editing mode, a character mode editing mode and a color mode editing mode.

For example, when the edited item (attribute) belonging to the document format is set, the operation mode is changed from the input mode to the document format editing mode to select an option for the corresponding edited item from the menu screen, and a value for the edited item is selected through the processing for selecting the option in the lower hierarchy. Also, when the edited item (attribute) belonging to the color format, the paragraph style, the color style, the character mode or the color mode is set, the same procedure is carried out.

As an example of editing, a case where the character color of a character string "Fragile" is set will be described below. That is, a case where the same character color is set for each character of the character string "Fragile" will be described below.

In this case, the user confirms that a cursor is positioned at the head character "F" of the character string, for which the same character color is set, and operates a predetermined function key (a color mode key in FIG. 3) 320 to change the operation mode from the input mode to the color mode editing mode. Thus, the display part 84 is switched to an editing screen in the color mode editing mode. At this time, an editing screen including edited item names belonging to the color mode as options in the first hierarchy is displayed. That is, an editing screen including the names of the above described character color attribute, outline color attribute, character shadow color attribute, enclosing line color attribute, intra-enclosure color attribute and half-tone dot meshing color attribute is displayed (the title of this editing screen is, e.g., "color mode"). Furthermore, when the area of the display part 84 is small, only a predetermined number of edited items belonging to the color mode are displayed.

The user suitably operates the cursor key 327 to set the cursor at the "character color attribute" to depress the select key 328. Furthermore, if the cursor is positioned at the "character color attribute" when the display part 84 is switched to the editing screen, the user depresses the select key 328 immediately. Furthermore, if the area of the display part 84 is small so that only a predetermined number of edited items belonging to the color mode are displayed thereon, the scroll function or the displayed item batch-switching function is activated in accordance with the operation of the cursor key 327.

Figure 8:
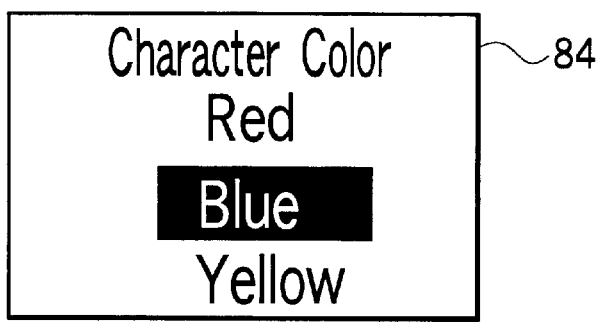
FIG. 8 is a schematic diagram showing an editing screen in the preferred embodiment when the color of characters is set.

If the select key 328 is depressed when the cursor is positioned at the "character color attribute", an editing screen including various character colors shown in FIG. 8 (an editing screen in the second hierarchy: title "character color") is displayed. The user suitably operates the cursor key 327 to set the cursor at a desired character color to depress the select key 328. Thus, the character color of the character string "Fragile" is set. Furthermore, after the character of the set color before another character, the same character color as that of the character "F", the color of which has been set herein, has been set.

Although printing may be carried out immediately after the inputted character is thus edited, the tape printing apparatus 1 is capable of simply verifying the edited contents which have been set for each editing before printing.

That is, information (printed information) based on the edited contents is capable of being batch-displayed on the display part 84 of the display screen 81. Furthermore, this function will be hereinafter referred to as a "check function". The tape printing apparatus 1 is characterized by the check function.

Referring to FIGS. 9 through 12, the check function will be described in detail below. The function key 320 relating to the check function (the check key 325) is provided. In order to execute the check function, the user depresses the corresponding function key 320 (the check key 325) of the keyboard 3.

Figure 9:
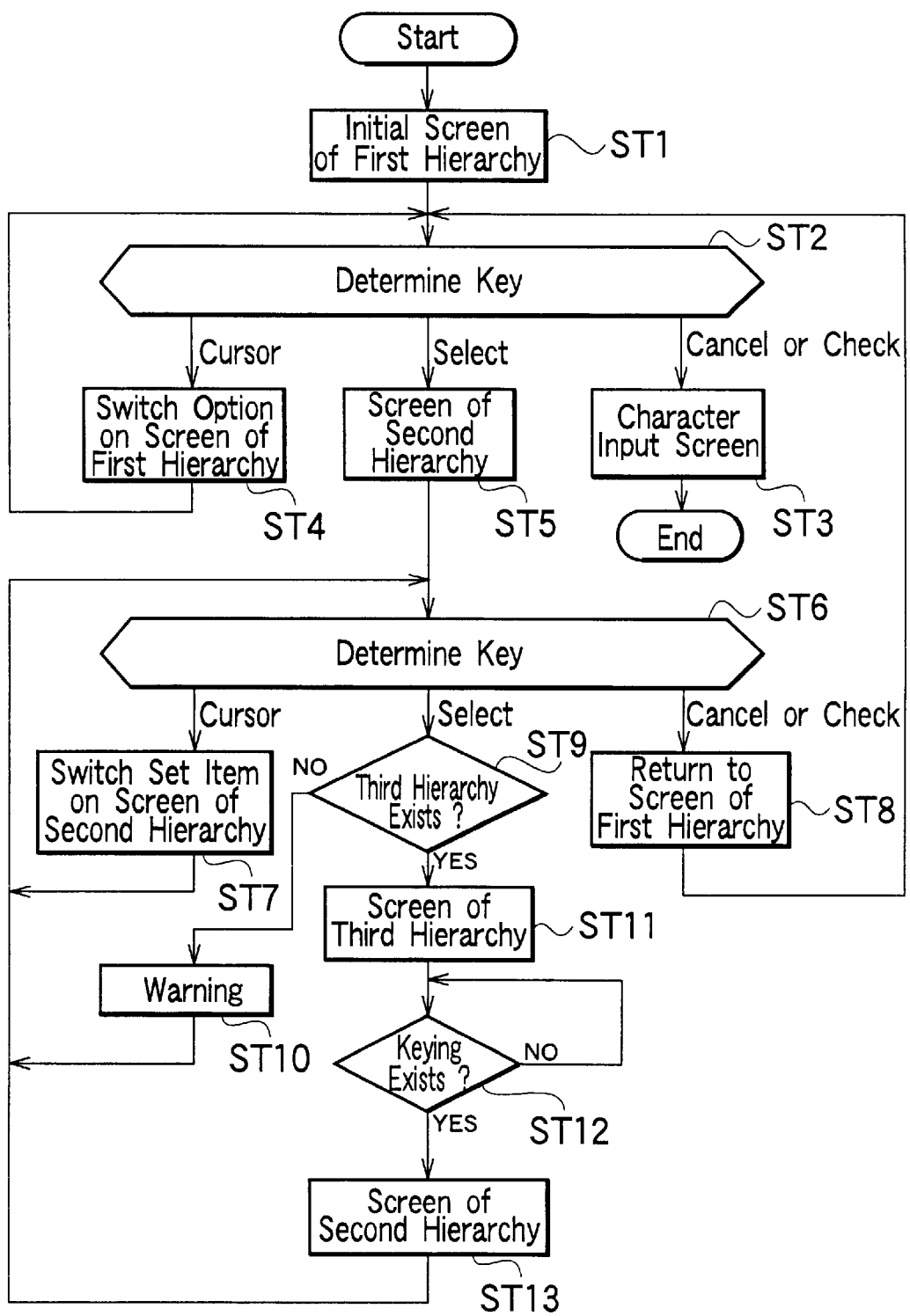
FIG. 9 is a flow chart showing a printed information display processing in the preferred embodiment.

At this time, the CPU 210 starts the execution of the printed information display program 223 shown in FIG. 9 to change the operation mode from the input mode to the printed information display mode and to change the screen of the display part 84 from the character input screen to the initial screen of the first hierarchy for displaying printed information (step ST1). Furthermore, in this processing, a processing for recognizing the paragraph and character, at which the cursor has been positioned on the last input screen, to align corresponding set values, which exist in the RAM 240, in a predetermined area of the RAM is also carried out.

The screen for displaying printed information has a hierarchical structure shown in FIG. 10.

The first hierarchy is a hierarchy for selecting options, and has the above described various editing modes relating to the setting of printed information, i.e., the "document format" editing mode, the "paragraph style" editing mode, the "character mode" editing mode, the "color format" editing mode, the "color style" editing mode, and the "color mode" editing mode, as options. Moreover, the first hierarchy has an option "used tape" for confirming the kind of a used tape, and an option "residual ink quantity" for confirming the residual quantity of ink, although each of these options is not printed information which is set in the editing processing.

The second hierarchy is basically a hierarchy for displaying the set value of each printed information (each edited item). In the second hierarchy for the "used tape", the kind of the loaded tape detected by the identification sensor 99 is displayed. In addition, in the second hierarchy for the "residual ink quantity", the residual quantity of an ink having the minimum residual quantity of the residual quantities of four kinds of inks detected by the residual ink quantity sensor 97 is displayed. This is displayed every, e.g., 5%. The items including the kind of the tape and the residual ink quantity are sometimes called edited items.

The third hierarchy is a hierarchy for displaying which editing mode can change a set value, which has been set for a certain edited item, or can set a new set value for a certain edited item. Therefore, the third hierarchy does not exist for the "used tape" and the "residual ink quantity".

Figure 11:
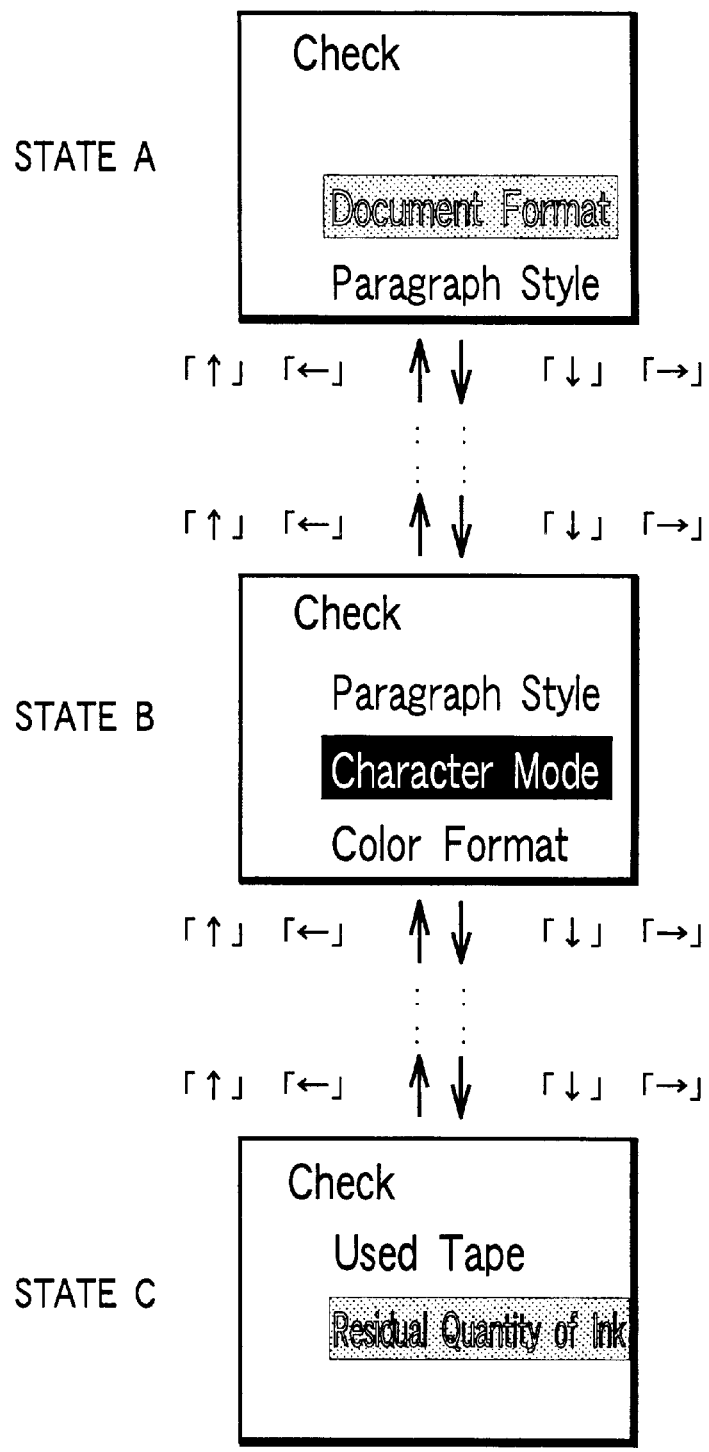
FIG. 11 is a schematic diagram for explaining an example of a printed information display screen in a first hierarchy in the preferred embodiment.

The initial screen of the first hierarchy at the above described step ST1 is shown in, e.g., STATE B in FIG. 11. The title on the screen of the first hierarchy is "check". On the initial screen of the first hierarchy, the cursor (inverted display) is set at the "character mode". The reason for this is that it is considered that there are most edited items existing in the character mode editing mode and that the possibility of causing the request for confirming the set value is greatest for the edited items in the character mode editing mode.

When the screen of the first hierarchy for displaying printed information is displayed, the CPU 210 waits for a keying and determines which key is operated when the keying is carried out (step ST2).

When a cancel key (a kind of the function keys 320) or the check key 325 is operated, the CPU 210 causes the display screen of the display part 84 to return to the input screen for characters (step ST3), and ends the processing for printed information display program 223.

When the cursor key 327 is operated, the option giving the cursor on the screen of the first hierarchy for displaying printed information is changed in the direction indicated by the operated cursor key 327 (step ST4), and the routine returns to the step ST2 serving as a key determining step. In this case, since the number of options which can be displayed on the display part 84 at a time is small as shown in FIG. 11, the scroll function is suitably executed. Furthermore, in place of the scroll function, the screen may be switched to a screen having different options.

STATE A in FIG. 11 shows the screen of the first hierarchy after, e.g., a cursor upward-moving key or a cursor left-moving key 327 is operated continuously two times from the state that the initial screen of the first hierarchy for displaying printed information shown at STATE B in FIG. 11 is displayed. STATE C in FIG. 11 shows the screen of the first hierarchy after, e.g., a cursor downward-moving key or a cursor right-moving key 327 is operated continuously five times from the state that the initial screen of the first hierarchy for displaying printed information shown at STATE B in FIG. 11 is displayed. When the cursor upward-moving key or the cursor left-moving key is operated in the display state shown at STATE A in FIG. 11, the key operation may be ignored, or the display state may be switched to the display state shown at STATE C in FIG. 11. Similarly, when the cursor downward-moving key or cursor right-moving key 327 is operated in the display state shown at STATE C in FIG. 11, the key operation may be ignored, or the display state may be switched to the display state shown at STATE A in FIG. 11.

As the display for the cursor, both of the inverted display and the blink display may be used. For example, the "character mode" wherein the number of edited items belonging thereto is largest may be respected to inversely display the cursor for the "character mode" to blink-display the cursors for other options.

If the select key 328 is operated while the screen of the first hierarchy for displaying printed information is displayed, the CPU 210 causes the screen of the second hierarchy relating to the option of the first hierarchy, at which the cursor has been positioned, to be displayed on the display part 84 (step ST5). Thereafter, the CPU 210 waits for a keying, and determines which key is operated if the keying is carried out (step ST6).

For example, the edited items giving the cursor when being switched to the screen of the second hierarchy at step ST5 are fixedly determined. For example, the edited items are determined to be those predicted to be more confirming frequencies, as the "constant-length printing" for the "document format", the "character size" for the "paragraph style", the "vertical/horizontal" for the "character mode", the "background color" for the "color format", the "frame line color" for the "color style", and the "character color" for the "color mode". Furthermore, for the "used tape" and the "residual ink quantity", in which a plurality of items do not exist, the cursor is naturally given to the detected result.

Furthermore, also as the display for the cursor on the screen of the second hierarchy, both of the inverted display and the blink display may be used.

Figure 12:
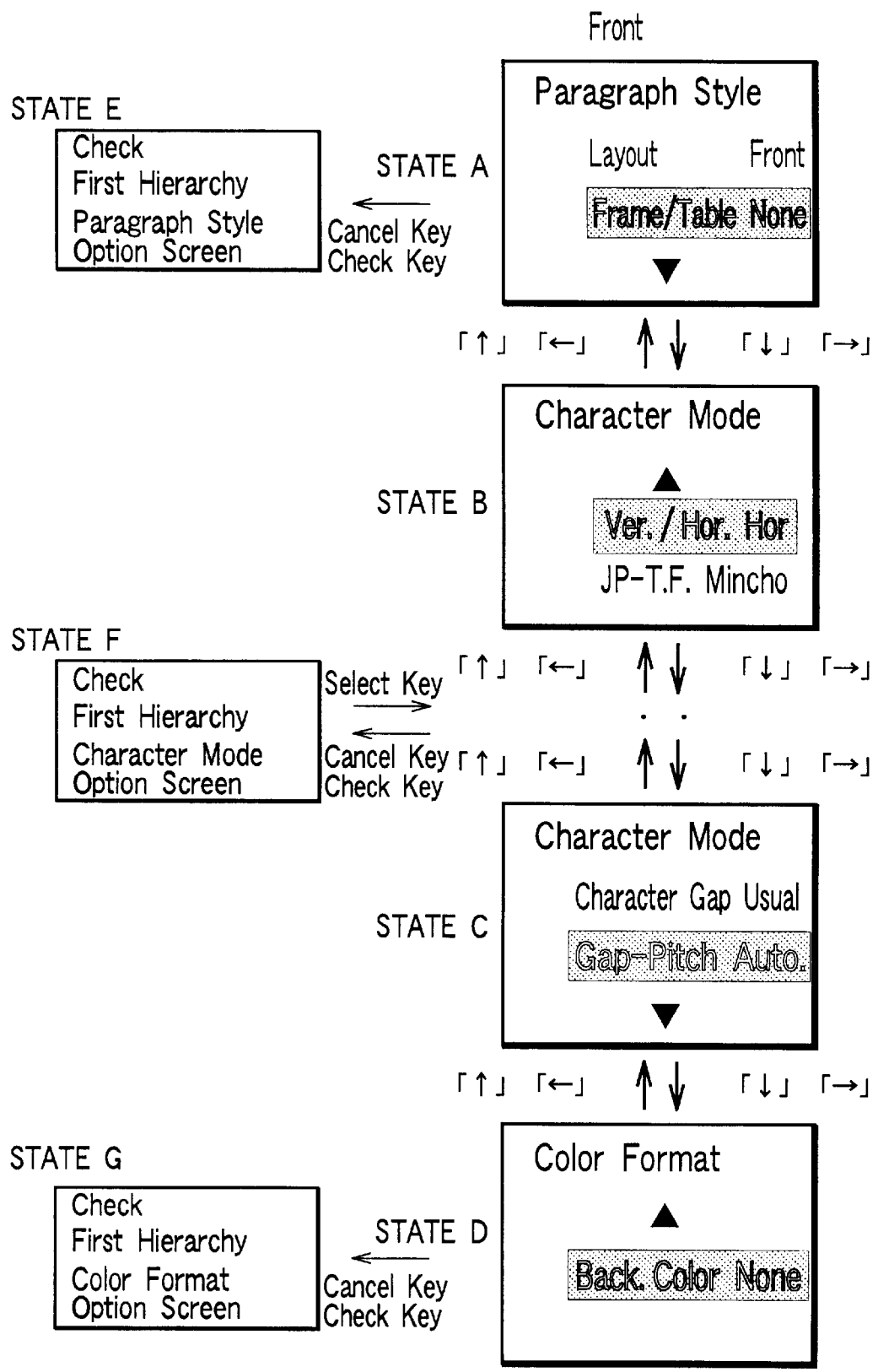
FIG. 12 is a schematic diagram for explaining an example of a printed information display screen in a second hierarchy in the preferred embodiment.

If the cursor key 327 is operated while the screen of the second hierarchy for displaying printed information is displayed, the CPU 210 changes the set value of the edited item, which gives the cursor on the screen of the second hierarchy for displaying printed information, in the direction indicated by the operated cursor key 327 (step ST7), and the routine returns to the step ST6 serving as the key determining step. In this case, since the number of set values for edited items which can be displayed on the display part 84 at a time is small as shown in FIGS. 12(*a*) through 12(*d*), the scroll function is suitably executed. Furthermore, in place of the scroll function, the screen may be switched to a screen having different set values for edited items.

Furthermore, at step ST7, if upward movement of the cursor is instructed by operation of a cursor key 327 while the cursor is positioned at the top edited item of a list of second hierarchy items belonging to one first hierarchy option, the display screen is switched and the cursor is moved to the bottom edited item (set value) of a list of second hierarchy items belonging to a different first hierarchy option directly above the one first hierarchy option including the top edited item (set value) from which the cursor was moved. For example, if the cursor upward-moving key or cursor left-moving key 327 is operated while the cursor is positioned at the top item "Ver./Hor. Hor." of the "character mode" shown at STATE B in FIG. 12, the display screen is switched to a screen wherein the cursor is moved to the bottom item "Frame/Table None" of the "paragraph style" as shown at STATE A in FIG. 12.

Furthermore, the top item "Ver./Hor. Hor." at STATE B in FIG. 12 indicates that the set value of the "vertical/horizontal attribute" is the "horizontal writing", and the end item "Frame/Table None" indicates that the set value of the "outer frame/tabular form attribute" is "nothing".

On the other hand, at step ST7, if the downward movement of the cursor is instructed by operation of a cursor key 327 while the cursor is positioned at the bottom edited item of a list of second hierarchy items belonging to one first hierarchy option, the display screen is switched and the cursor is moved to the top edited item (set value) of a list of second hierarchy items belonging to a different first hierarchy option directly below the one first hierarchy option including the bottom edited item (set value) from which the cursor was moved. For example, if the cursor downward-moving key or cursor right-moving key 327 is operated while the cursor is positioned at the bottom item "Gap-Pitch Auto." of the "character mode" shown at STATE C in FIG. 12, the display screen is switched to a screen wherein the cursor is moved to the top item "Back Color None" of the "color format" as shown at STATE D in FIG. 12.

Furthermore, if the upward movement of the cursor is instructed by the cursor key 327 while the cursor is positioned at the top item "ground tint" of the "document format" at the uppermost stage of the first hierarchy, the display screen is switched to a screen wherein the cursor is given to the only second hierarchy item "residual ink quantity" of the lowermost stage of the first hierarchy, although this is not shown. In addition, if the downward movement of the cursor is instructed by the cursor key 327 while the cursor is positioned at the only second hierarchy item "residual ink quantity" of the "residual ink quantity" at the lowermost stage of the first hierarchy, the display screen is switched to a screen wherein the cursor is given to the top item "ground tint" of the "document format" at the uppermost stage of the first hierarchy, although this is not shown.

As described above, the tape printing apparatus 1 can switch the display screen to any one of different screens of the second hierarchy below the first hierarchy without returning to the first hierarchy once, and can easily confirm the set item.

If the cancel key 320 or the check key 325 is operated while the screen of the second hierarchy for displaying printed information is displayed, the CPU 210 causes the display screen of the display part 84 to return to the screen of the first hierarchy (step ST8), and the routine returns to the above described step ST2 serving as the key determining step. In the return of the screen of the first hierarchy, the cursor is given to the first hierarchy option including the second hierarchy edited item, at which the cursor has been positioned.

For example, if the cancel key 320 or the check key 325 is operated while a screen wherein the cursor is given to the end item "Frame/Table None" of the "paragraph style" is displayed as shown at STATE A in FIG. 12, the screen is switched to a first hierarchy screen wherein the cursor is given to the "paragraph style" shown at STATE E in FIG. 12. In addition, if the cancel key 320 or the check key 325 is operated while a screen wherein the cursor is given to the item "Ver./Hor. Hor." or "Gap-Pitch Auto." of the "character mode" (this indicates that the set value of the "pitch attribute" is "automatic") is displayed as shown in STATE B or C in FIG. 12, the screen is switched to a first hierarchy screen wherein the cursor is given to the "character mode" shown at STATE F in FIG. 12. Moreover, if the cancel key 320 or the check key 325 is operated while a screen wherein the cursor is given to the item "Back. Color None" of the "color format", the screen is switched to a first hierarchy screen wherein the cursor is given to the "color format" shown at STATE G in FIG. 12. Furthermore, STATES E though G in FIG. 12 show the kinds of the display screen, not the display screen itself.

Thus, by the return function to the first hierarchy screen, it is possible to easily confirm the set values of two edited items belonging to two kinds of first hierarchies of stages separated due to the construction of FIG. 10. That is, it is possible to decrease the number of user's operations and the time required for confirmation, in comparison with a case where such confirmation is carried out while the second hierarchy is maintained.

If the select key 328 is operated while the screen of the second hierarchy for displaying printed information is displayed, the CPU 210 confirms whether the third hierarchy exists below the second hierarchy (step ST9).

If the third hierarchy does not exist (in the case of the "used tape" or "residual ink quantity"), the CPU 210 gives a soft warning (step ST10) , and then, the routine returns to the above described step ST6 serving as the key determining step.

On the other hand, if the third hierarchy exists, a message screen indicating which editing mode allows an edited item, at which the cursor has been positioned, to be set or updated, is displayed on the display part 84 (step ST11). Thereafter, the CPU 210 waits for an optional key operation, and returns to the display screen of the second hierarchy (steps ST12, ST13). Then, the routine returns to the above described step ST6 serving as the key determining step.

FIG. 13 shows an example of a display screen in the third hierarchy for the "document format". By the message "Possible to designate by document format", it is possible to inform the user that the edited item, at which the cursor has been positioned, can be set or updated in the document format editing mode.

As described above, by the check function, it is possible to inform the user of the editing mode capable of setting or updating the edited items, so that it is possible to cause the apparatus to be convenient for the user.

After the user confirms the printed information (the set value of the edited item) by the check function described above, the user operates the print key 321 to print a printed image reflecting the set editing on the printed tape T1 to stick the laminate tape T2 on the printed part. Thereafter, the printed part of the tape T is discharged from the tape exit 10 to the outside to be cut to complete a label.

As described above, according to the above described preferred embodiment, since the printed information can be batch-displayed on the display part 84, it is not required to switch the display part to an editing screen again and again in order to confirm the printed information unlike the conventional apparatus, and it is possible to easily and simply confirm all or required printed information. Therefore, the user can easily and quickly carry out operations for inputting, editing and printing characters or the like, and have the detailed image of an image to be printed before printing.

In addition, according to the above described preferred embodiment, since the display structure for displaying the printed information is a hierarchical structure, it is possible to easily display the printed information when a part of the printed information is confirmed, so that the apparatus is convenient. Furthermore, since movement is allowed between different second hierarchies even if the hierarchical structure is adopted, the confirmation of all or a large number of printed information is not complicated.

Moreover, according to the above described preferred embodiment, since the hierarchical display structure for displaying the printed information informs the user of the editing mode for setting and updating the printed information (the edited item), this is very convenient particularly for beginners.

Furthermore, in the above described preferred embodiment, while the change of the printed information display mode to the editing mode has not been allowed, i.e., while the input mode has been changed to the editing mode after returning from the printed information display mode to the input mode, the printed information display mode may be changed directly to the editing mode. For example, the printed information display mode may be changed to a corresponding editing mode by operating the select key 328 or the editing function key 320 in the screen display state of the third hierarchy, or the printed information display mode may be changed to a corresponding editing mode by operating the select key 328 or the editing function key 320 in the screen display state of the first or second hierarchy. In the latter, the third hierarchy may be omitted.

In addition, in the above described preferred embodiment, while the "kind of tape" and the "residual ink quantity" have also been displayed in the printed information display, only the printed information may be displayed. In this case, the "kind of tape" and the "residual ink quantity" may be displayed when, e.g., the power supply is turned ON.

Moreover, the hierarchical structure for displaying the printed information should not be limited to that in the above described preferred embodiment. For example, the "style" may be provided as a first hierarchy option, the "paragraph style" and the "color style" may be provided as second hierarchy options, and a set value for a concrete edited item may be displayed in the third hierarchy.

In addition, while the tape printing apparatus in the above described preferred embodiment has been equipped with means for inputting a printed image (a character image and a background image), the tape printing apparatus may be applicable to the transfer of a printed image inputted by a personal computer or the like. In this case, the personal computer or the like constitutes the input means of the tape printing apparatus. In addition, the apparatus for carrying out printing may be an apparatus which does not have complete input means.

Moreover, in the above described preferred embodiment, while the present invention has been applied to the tape printing apparatus, the invention may be applied to a word processor or the like.

As described above, according to the present invention, since the printed information of an image to be printed can be batch-displayed on the display screen by the hierarchical structure, it is possible to easily and simply confirm all or part of the printed information before printing.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A printing apparatus comprising:

image display means for displaying an image to be printed on a display screen;

screen switching means for switching said display screen of said image display means to any one of a plurality of print attribute setting screens for setting print attribute information of said image to be printed;

storage means for storing print attribute information of said image to be printed, said print attribute information being based on a content of print attribute set at each of said print attribute setting screens; and print attribute information display means for displaying said print attribute information, which is stored in said storage means, on said display screen by hierarchical print attribute information screens, wherein said print attribute information display means in response to said screen switching means displays consecutively lower hierarchical print attribute options belonging to different upper hierarchical print attribute options without returning to a screen displaying the upper hierarchical print options.

2. A printing apparatus according to claim 1, wherein a print attribute information screen in an upper hierarchy of said hierarchical print attribute information screens includes a state information on printing means for carrying out printing and an information on a printed medium.

3. A printing apparatus according to claim 1, wherein a print attribute information screen in a lower hierarchy of said hierarchical print attribute information screens includes an information for introducing a print attribute setting screen for setting said print attribute information.

4. A printing apparatus according to claim 1, wherein said printed information display means is capable of carrying out a scroll display of information, which is included in said printed information screens, on said display screen.

5. A printing apparatus according to claim 1, wherein when all information included in each of said print attribute information screens is not able to be displayed on said display screen, said print attribute information display means is capable of selectively displaying another information, which is not able to be displayed, on said display screen.

\* \* \* \* \*